April 1, 1947.  J. E. STANWORTH  2,418,202
FLUORESCENT LAMP AND METHOD OF MANUFACTURE
Filed April 1, 1942
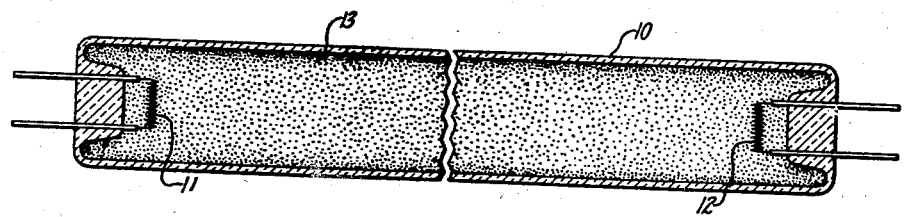
Inventor:
John E. Stanworth,
by John H. Anderson
His Attorney.

Patented Apr. 1, 1947

2,418,202

UNITED STATES PATENT OFFICE 2,418,202

FLUORESCENT LAMP AND METHOD OF MANUFACTURE

John E. Stanworth, Rugby, England, assignor to General Electric Company, a corporation of New York Application April 1, 1942, Serial No. 437,289
In Great Britain July 7, 1941

1 Claim. (Cl. 176—122)

My invention relates to electric discharge lamps the envelopes of which bear a coating of fluorescent material which serves as a secondary light source, being energized by radiations in the ultraviolet range produced by the discharge taking place within the lamp. For protective purposes such coating is customarily located on the inner wall or surface of the envelope.

It is a well known fact that the light output from such fluorescent lamps decreases with use. While a certain diminution in fluorescence can be attributed to the aging of the fluorescent material, I have discovered that the constituents of the surface of the glass support with which the fluorescent powder is in contact have a considerable effect on the rate of diminution of light output.

It is the object of my invention to reduce this rate of fall in light output of the fluorescent material, and accordingly one species of my invention consists in a fluorescent electric discharge lamp in which the surface of the glass envelope in contact with the coating of fluorescent material is substantially free from soda which substance has, I have discovered, an adverse effect on the light emitting power of the fluorescent material. By "substantially free from soda" I mean that the surface of the glass has no soda or an amount insufficient to affect deleteriously the light emitting power of the fluorescent material in contact with said surface.

When the envelope consists of a soda-silica glass, the soda may be removed from the surface of the envelope with which the fluorescent material is to be in contact by annealing the glass while in contact with sulphur dioxide and air and then substantially washing the surface when cold. The glass may be heated at the annealing temperature in a furnace fired with gas containing sulphur and in such a way that the products of combustion are in contact with the surface of the glass. In the event that the gas is deficient in sulphur, this may be introduced by means of carbon disulphide, elementary sulphur or the like. After having been cooled slowly from the annealing temperature to avoid the introduction of undesirable strains, the glass may be washed first in tap water and then in distilled water.

An alternative method of producing a surface substantially free from soda on a glass support containing this substance is by treating the glass with dilute nitric acid. A suitable glass for such treatment is one having the following composition in percentages by weight:

Silica ($SiO_2$) _____ 40
Barium oxide (BaO) _____ 40
Boric oxide ($B_2O_3$) _____ 5
Alumina ($Al_2O_3$) _____ 5
Soda (NaO) _____ 10

The glass may be washed with 1 per cent nitric acid for 5 minutes at room temperature, although other strengths of acid and temperatures may equally well be used and the time also is not critical. This treatment dissolves out the bases from the glass and leaves a surface skin of silica. The fluorescent material is disposed on the silica skin in the usual manner during manufacture of the lamp.

In the drawing accompanying and forming part of this specification a species of fluorescent lamp having an envelope embodying my invention is shown in a longitudinal sectional view.

The tubular envelope 10 of the lamp illustrated has a pair of cooperating thermionic electrodes 11 and 12 comprising a coiled filament of refractory metal, preferably tungsten, provided with material of low work function, such as the oxides of barium, calcium, and strontium. The envelope 10 has therein a gaseous atmosphere, such as argon, at a pressure of a few millimeters, such as 1 to 10 mm., and a small quantity of mercury, the vapor of which is luminosity producing when excited by an electric discharge between said electrodes 11 and 12. In its preferred form, the lamp is operated at low vapor pressures of the order of 1 to 20 microns, for example, although the invention is not limited to such pressures. However, as is well known, such operation results in the production of radiation of 2537 A wavelength at high efficiencies.

The envelope 10 consists of a glass containing a substantial amount of soda, such as the glass disclosed above, and the surface of the glass is substantially free from soda as above defined. In a lamp operated as stated above, a layer 13 of fluorescent material which is particularly responsive to radiation of 2537 A. wavelength is disposed on said surface and surrounds the discharge path between said electrodes 11 and 12. Such materials are now well known in the art and as examples thereof zinc silicate, magnesium tungstate and cadmium borate may be mentioned. The fluorescent material converts or transforms the radiation of 2537 A. wavelength emitted by the discharge into radiation of longer wavelength, such as visible light.

When desired, sheet metal electrodes, such as those used in luminous signal tubing, are used in place of the thermionic electrodes 11 and 12 in the lamp shown in the drawing.

What I claim as new and desire to secure by Letters Patent of the United States is:

The method of increasing the useful life of a fluorescent body for an electric discharge lamp comprising a support of ordinary homogeneous glass having soda as a constituent thereof and powdered fluorescent material disposed on the surface of said support, said material being deleteriously affected by soda, which method comprises the step of annealing the glass while in contact with sulphur dioxide and air and then washing the surface of the glass support when cold so that a layer of the glass at the said surface is substantially free from soda before said material is applied thereto.

JOHN E. STANWORTH.

REFERENCES CITED

The following references are of record in the file of this patent:

UNITED STATES PATENTS

| Number | Name | Date |
| --- | --- | --- |
| 2,030,397 | Reynolds | Feb. 11, 1936 |
| 2,030,440 | Fritze et al. | Feb. 11, 1936 |
| 1,735,302 | Slack | Nov. 12, 1929 |
| 2,295,626 | Beese | Sept. 15, 1942 |
| 2,238,784 | Scott | Apr. 15, 1941 |
| 2,278,742 | Scott | Apr. 7, 1942 |
| 2,216,237 | Hannum | Oct. 1, 1940 |
| 2,272,992 | Hebo | Feb. 10, 1942 |
| 2,303,756 | Nordberg & Rumenapp | Dec. 1, 1942 |
| 2,315,329 | Hood & Nordberg | Mar. 30, 1943 |

Certificate of Correction

Patent No. 2,418,202. April 1, 1947.

JOHN E. STANWORTH

It is hereby certified that errors appear in the printed specification of the above numbered patent requiring correction as follows: Column 1, line 37, for the word "substantially" read *subsequently*; column 2, line 49, for "signal" read *sign*; and that the said Letters Patent should be read with these corrections therein that the same may conform to the record of the case in the Patent Office.

Signed and sealed this 7th day of October, A. D. 1947.

[SEAL]

THOMAS F. MURPHY,
*Assistant Commissioner of Patents.*